United States Patent [19]

Nowack et al.

[11] Patent Number: 4,635,422
[45] Date of Patent: Jan. 13, 1987

[54] INTERLOCKING SEAL FOR INSULATED PANELS

[75] Inventors: William C. Nowack, Twin Lakes, Wis.; Stephen J. Moore; Kenneth F. Weger, Jr., both of Cary, Ill.

[73] Assignee: Knaack Manufacturing Company, Crystal Lake, Ill.

[21] Appl. No.: 631,410

[22] Filed: Jul. 16, 1984

[51] Int. Cl.$^4$ .................................................. E04B 2/00
[52] U.S. Cl. ........................................ 52/406; 52/461; 52/471; 52/584
[58] Field of Search ................ 52/461, 404, 406, 588, 52/478, 802, 823, 471, 584, 809, 580, 463, 464, 762

[56] References Cited

U.S. PATENT DOCUMENTS

2,103,407 12/1937 Dean .................................. 52/461 X
3,623,290 11/1971 Downing, Jr. .................... 52/461 X
4,435,935 3/1984 Larrea .............................. 52/471 X Primary Examiner—Carl D. Friedman
Assistant Examiner—Naoko N. Slack
Attorney, Agent, or Firm—Leydig, Voit & Mayer

[57] ABSTRACT

In a series of insulated panel members an interlocking labyrinth seal is provided to minimize the heat loss, the seal having a pair of first slots for receiving a U-shaped clip, a pair of second slots for receiving an offset spacer, and a plurality of right angle flanges for locking the offset spacer into the second slots. Insulated panel members are placed in end-to-end relationship and locked together when the U-shaped clip is inserted into the first slots and retained in position by an undercut slot. Heat loss through the seal is minimized because slots in the spacers expose insulation material into the area where the heat loss can occur.

12 Claims, 9 Drawing Figures

INTERLOCKING SEAL FOR INSULATED PANELS

FIELD OF THE INVENTION

The invention relates generally to insulated panel members which are interlocked to form a wall for an oven finishing system and the like. More particularly, a plurality of insulated panel members are locked in end-to-end relationship such that a labyrinth seal is created between the panel members to improve the heat retaining characteristics of the oven.

BACKGROUND OF THE INVENTION

In general, in the finishing system art there are known means for connecting insulated panel members in an end-to-end relationship, such as shown in U.S. Pat. No. 3,376,678. The main objective in manufacturing insulated panels is to provide a panel which is easily assembled at a job site, and that can minimize the heat loss from the inside of the oven to the outside of the oven once the panels are joined together. In addition, the seal between abutting panel members must be able to expand and contract during the heating and cooling cycle of the oven. Most of the prior art insulated panels are connected by clips which have a tendency to loosen and back out due to the stresses caused by expansion and contraction. This further reduces the sealing capabilities of the prior art panels. Some prior art panels have the locking clips welded in place, making field replacement difficult and the welds can create hot spots as well as being subject to cracking. Although the prior art discloses panels which are joined in an interlocking relationship, there remains the problem of excessive heat loss through the seal and the inability of panels and seals to expand and contract during the heating and cooling cycles.

SUMMARY OF THE INVENTION

It is the primary object of the present invention to provide an interlocking labyrinth seal to connect abutting insulated panel members in end-to-end relationship to form a wall of interconnected panel members.

Another object of the invention is to provide a means for locking the insulated panels together which has the capability of expanding and contracting, yet will not loosen and back out or fall out over time and is easily removed in case a panel member becomes defective and requires replacement.

It is a further object to provide a seal which is capable of expanding and contracting during the heating and cooling cycle of an oven and yet maintain its sealing capabilities and minimize the heat loss therethrough.

It is another object of the present invention to provide a means for exposing the insulation of one panel member to the insulation of an abutting panel member, thereby substantially eliminating any air gap between panels for the purpose of minimizing the heat loss through the seal.

It is also an object of the present invention to provide a seal which has no welds or fastening means which may have a tendency to become weak spots under continual heating and cooling cycles.

In accordance with the present invention, a locking means is provided to lock together a series of insulated panel members in an end-to-end relationship to form a wall of interconnected insulated panels. The locking means is in the form of a labyrinth seal which is adapted to expand and contract when necessary in order to interlock the various panel members together. Means is also provided to expose the insulation of one panel member to the insulation of an abutting panel member inside the seal area which serves to minimize the heat loss through the seal.

Other objects and advantages of the invention will become apparent upon reading the attached detailed description and upon reference to the drawings, in which:

While the invention will be described with reference to certain preferred embodiments, it will be understood that we do not intend to be limited to the embodiments shown, but intend, on the contrary, to cover the various alternative forms of the invention included within the spirit and scope of the appended claims.

DETAILED DESCRIPTION OF THE INVENTION

Figure 1:
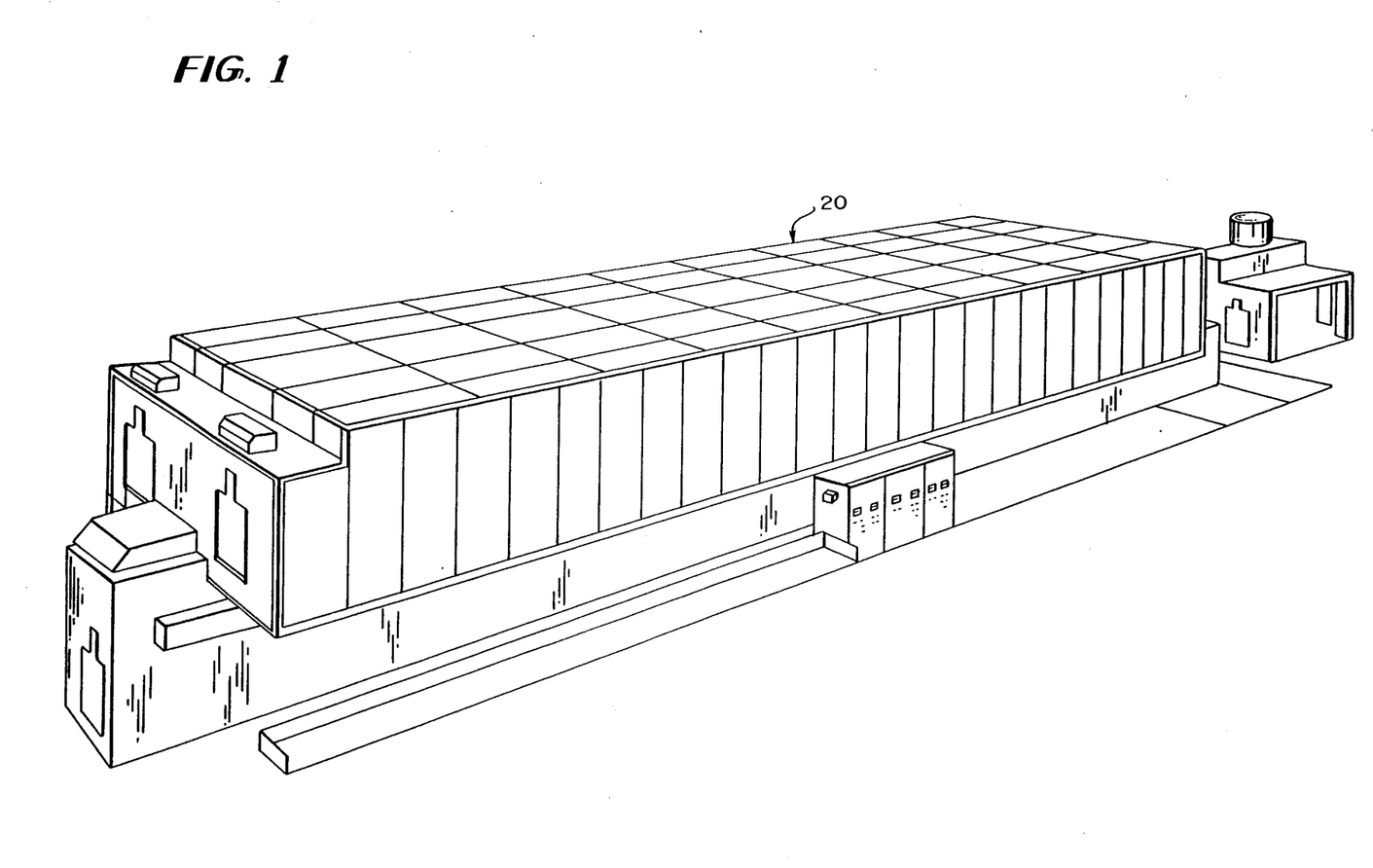
FIG. 1 is a perspective view of a finishing system depicting a plurality of insulated panel members in their assembled condition.

In a typical finishing system 20, such as the one shown in FIG. 1, a series of insulated panels are assembled to form a heat barrier such as the oven shown. Finishing system 20 can be tailored to suit the user's specifications, i.e., the insulated panels which make up the finishing system can be built to virtually any height, length and width as is required by a particular user. However, standard sized panels can be mass produced more economically than panels built for customized finishing systems, therefore it is a common practice to provide an insulated panel which comes in several standard sizes and which is easily assembled at a construction site.

Figure 2:
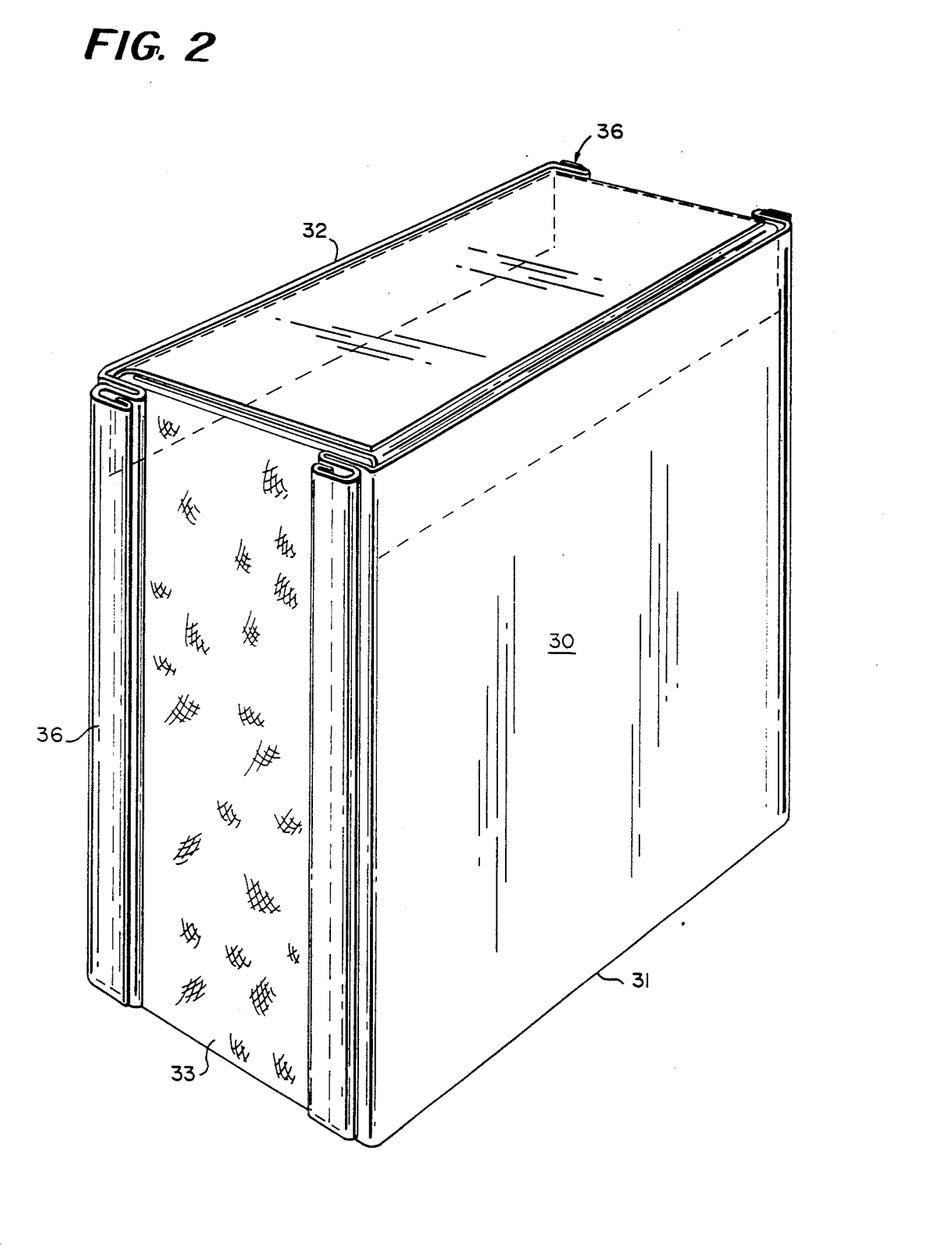
FIG. 2 is a perspective view of an inner and outer skin with the interlocking seals already formed, but without the spacer which separates the skins from one another.

In keeping with the preferred embodiment, there is shown in FIG. 2 a single insulated panel 30 before it is assembled to other panels to form a finishing system oven. As can be seen, an inner skin 31 and an outer skin 32 are spaced a distance apart and have an insulative material 33 packed in between. The insulative material 33 can be of any commercial type which is capable of withstanding high temperatures. Typically, the inner and outer skins will be an aluminized sheet material of approximately 20 gauge, however, other materials and material thicknesses can be substituted depending on the need.

In further keeping with the invention as shown in FIGS. 2-5, an interlocking labyrinth seal 36 is formed to lock abutting panels in end-to-end relationship to form a wall. In order to form seal 36, end flap 37, 38 of inner skin 31 and outer skin 32 are bent to form slots which will receive a locking channel. End flap 37, 38 is bent inwardly a short distance to form undercut slot 55 (discussed infra) before it is straightened to approximately 90° relative to skin 31, also for a short distance. End flap 37, 38 is then bent outwardly at an angle of approximately 180° so that first slot 39, 40 is formed. A second slot 41, 42 is formed by bending flap 37, 38 inwardly approximately 180° for a distance approximately the same as with first slot 39, 40. First slot 39, 40 should be approximately equal in bend radius and length as that of second slot 41, 42. To complete the formation of seal 36, end flap 37, 38 is bent approximately 180° outwardly and into second slot 41, 42 to form lip 43, 44. Each slot and lip has a specific purpose which is more fully described below.

In order to lock two insulated panels 30 together, the panels are first positioned so that second slot 41,42 of one panel abuts second slot 45, 46 of a second panel. A U-shaped clip 50 (see FIGS. 3 and 4), having legs 51, 52, is inserted into first slot 39 of one panel, and first slot 47 of a second panel whereby legs 51, 52 slide into slot 39, 47 and slots 41 and 45 are held firmly between legs 51, 52. In order to facilitate insertion into slots 39, 40 and 47, 48, U-shaped clip 50 has flared ends 53, 54 at the end points of legs 51, 52. The amount of flare might range from 0° to 30° and it is incorporated to reduce the resistance against pushing clip 50 over the rounded curves of slots 39, 40 and 47, 48. It is intended that U-shaped clip 50 fit snugly in slots 39, 47 so that it will in effect "pull" the two panels together. Of course, a U-shaped clip is also inserted in slots 40, 48, but this is not shown in FIG. 3.

Figure 3:
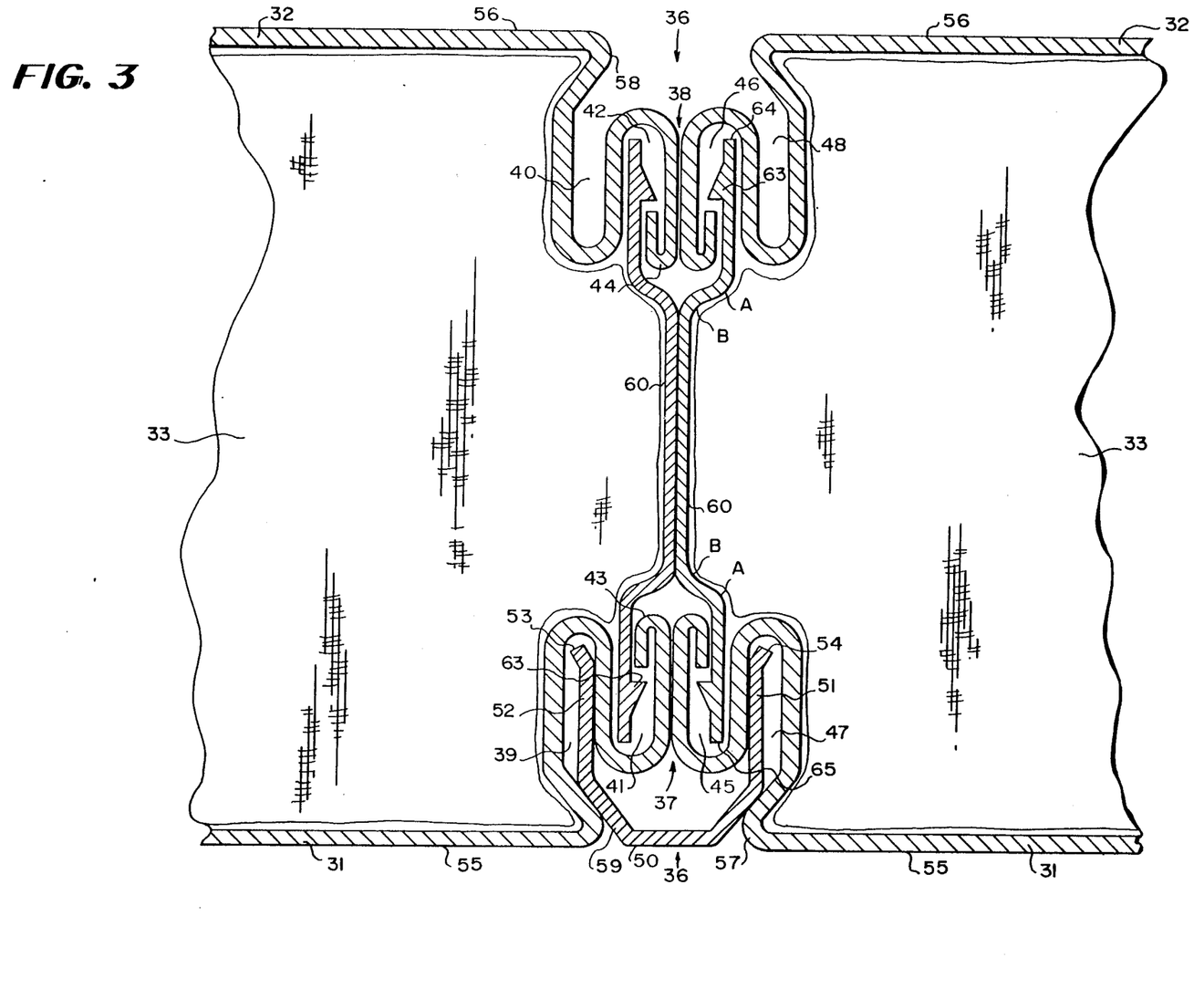
FIG. 3 is a cross-sectional view of a typical labyrinth seal showing the U-shaped clip locked into the first slots and an offset spacer separating the inner and outer skins.
Figure 4:
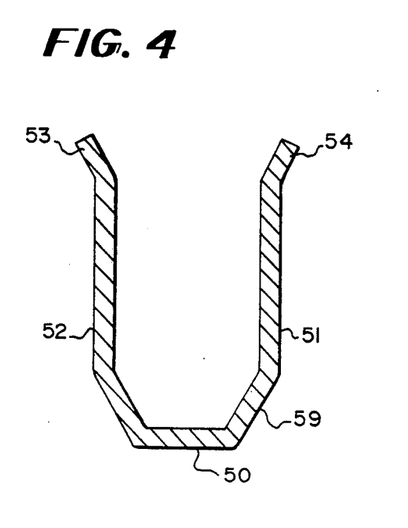
FIG. 4 is a cross-sectional view of the U-shaped clip.

Once it is snapped into place, clip 50 remains flush to or slightly below the skin surface 55, 56 and it will remain firmly locked in place because it is restrained by undercut slot 57, 58. Each clip 50 has a angled flat 59 at the base of leg 51, 52 which is at an angle substantially similar to the angle formed by undercut slot 57, 58. When clip 50 is installed, angled flat 59 mates undercut slot 57, 58 as shown in FIG. 3, thereby retaining clip 50 in slots 39, 47, even during periods of high stress. Clip 50 will not back out or loosen under the stresses caused by the expanding and contracting panels, yet it can easily be pryed out of slots 39, 47 and 40, 48 if it becomes necessary to replace a defective panel or a panel which has become damaged. Also, by being at or slightly below the skin surface, clip 50 will not be visible, giving the panel a more esthetic appearance, and clip 50 will not catch on parts as they travel through the oven.

Generally, extreme bending forces are created during the heating cycle causing the inner skin to expand while the outer skin remains essentially unchanged, which has the tendency to bow the panels toward the outer skin. To overcome this, first slot 39, 40, 47, 48 and second slots 41, 42 and 45, 46 are formed with sufficiently rounded bends so that during the heating cycle, the seal 36 can absorb any expansion and prevent the panels from bowing outward.

Figure 5:
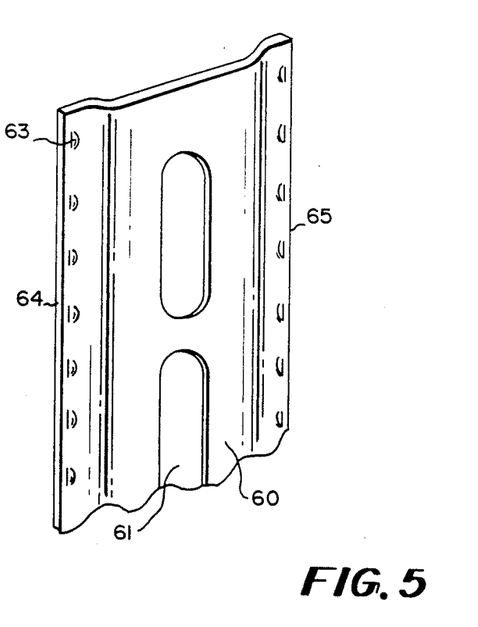
FIG. 5 is a partial perspective view of the offset spacer which separates the inner and outer skins, showing the raised flanges on each edge and a series of slots along the longitudinal length of the spacer.

To complete the seal assembly 36 and further in accordance with the invention, offset spacer 60 slidably engages second slots 41, 42, 45, 46 in a bayonet-like manner. After spacer 60 is installed, it defines the distance between inner skin 31 and outer skin 32 and it provides a barrier to retain insulative material 33. As can be seen in FIGS. 3 and 5, offset spacer 60 has a bend which is transverse to its longitudinal axis and located at points A and B in FIG. 3. Having a bend at points A and B not only increases the overall strength of spacer 60, but it also forms a biasing means to help create a more secure seal. In this embodiment, the spacer of one panel will abut the spacer of an adjoining panel and, because each spacer 60 is offset, a slight force is created which biases the spacers away from each other. As the panels are pushed toward each other, the biasing force between the spacers increases, which is desired, because it helps to create a squeezing action by U-shaped clip 50 once it is installed.

As can be seen in FIG. 5, spacer 60 has a plurality of longitudinal slots 61 which are provided to expose insulative material 33 of one panel to the insulative material 33 of an abutting panel. The insulative material 33 of abutting panels will actually contact each other where slots 61 are aligned so that the heat loss in this area is greatly reduced. In fact, it is desirable to make slots 61 as long as possible without sacrificing strength so that more insulation is exposed and to reduce the amount of heat conducting metal of spacer 60.

In order to hold spacer 60 stationary in second slot 41, 42, 45, 46, a plurality of right angle flanges 63 are provided along edge 64, 65. Flanges 63 frictionally engage lip 43, 44 when spacer 60 is slid into second slot 41, 42, 45, 46, and lip 43, 44 will act on flanges 63 to prevent spacer 60 from pulling out of the second slot during periods of high stress or when buckling forces occur.

In further keeping with the invention, means is provided to seal the top and bottom of insulated panel 30. In turning to FIG. 6 it can be seen that outer skin 32 has top plate 70 and a bottom plate 71 which are bent approximately 90° and extend a distance toward inner skin 31. The plates 70 and 71 preferably contact insulation 33 and provide a partial barrier to retain it. A metal flap 73, 74 is bent approximately 80°, with first leg 75 and second leg 76 positioned between insulation 33 and inner skin 31 and the flaps 73, 74 overlapping insulation 33 and plates 70, 71.

Figure 6:
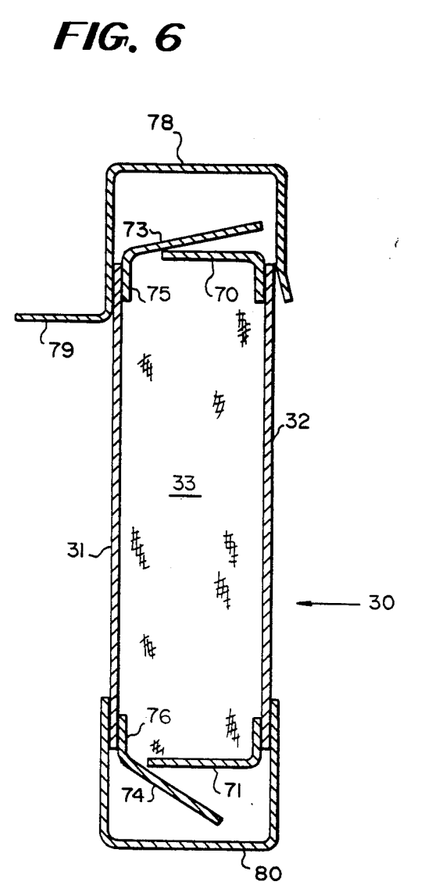
FIG. 6 is a cross-sectional view taken substantially along the longitudinal length of a panel member, showing the top and bottom sealing means for a panel member.

A top retainer cap 78 slidably engages skins 31, 32 as it covers and seals flap 73 and plate 70. It is intended that cap 78 fit snugly, however, it is actually held down by roof panels which rest on ledge 79.

A bottom retainer cap 80 slidably engages skins 31, 32 as it covers and seals flap 74 and plate 71. It is also intended that cap 80 fit snugly, however, it is held in place by the weight of the panel assembly and roof section.

Figure 7:
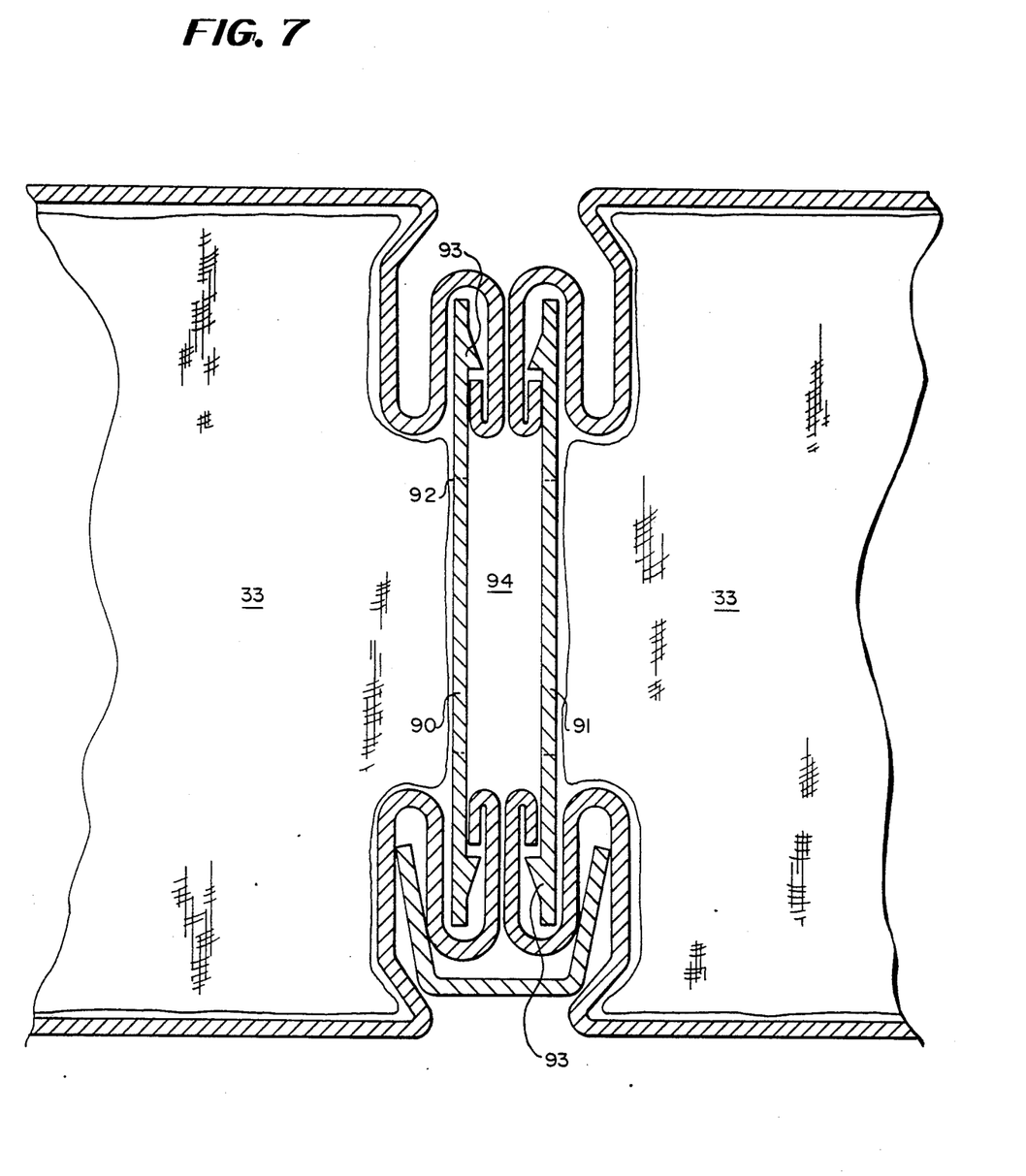
FIG. 7 is a cross-sectional view of a labyrinth seal showing a spacer which has a small air gap in the seal area.

An alternative embodiment, as seen in FIG. 7, shows spacer 90, 91 as a substantially flat piece of sheet metal having a plurality of longitudinal slots 92 (not shown) similar in size and design as those of offset spacer 60. Also, spacer 90, 91 has a plurality of right angle flanges 93 which function identically to those described for spacer 60. As can be seen, when two panels are drawn together, spacer 90 does not mate spacer 91, thereby creating a small air gap 94 between the panels. It is desirable to allow insulative material 33 of each panel to fill into air gap 94 to minimize the heat loss in this area. It is contemplated that air gap 94 be very narrow, on the order of ¼ inch or less.

Figure 8:
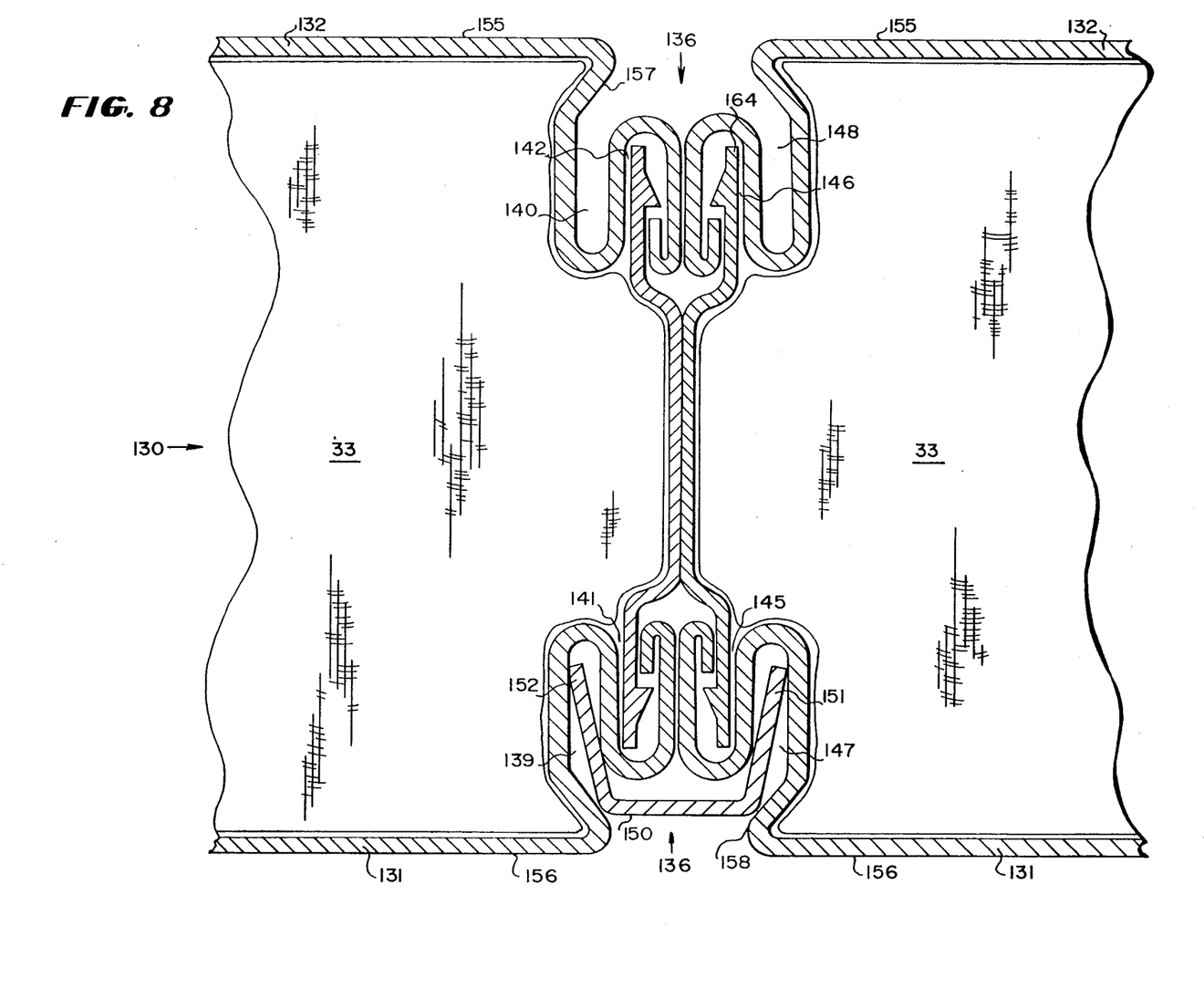
FIG. 8 is a cross-sectional view of a typical labyrinth seal showing an alternative embodiment of the U-shaped clip.
Figure 8A:
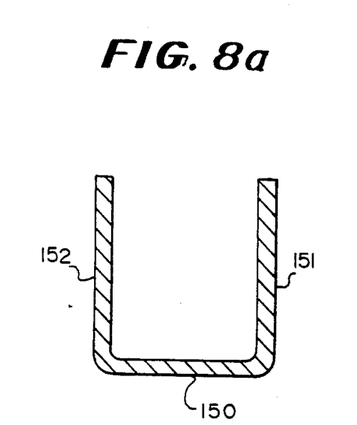
FIG. 8a is a cross-sectional view of an alternative embodiment of the U-shaped clip.

As an alternative embodiment in forming seal 136 and locking two insulated panels 130 together, there is shown in FIG. 8 a pair of panels which are first positioned so that second slot 141, 142 of one panel abuts second slot 145, 146 of a second panel. A U-shaped clip 150 (see FIG. 8a), having legs 151, 152 with 90° curves at their respective bases, is inserted into first slot 139 of one panel, and first slot 147 of a second panel whereby legs 151, 152 slide into slot 139, 147 and slots 141 and 145 are held firmly between legs 151, 152. By comparing FIGS. 8 and 8a, it can be seen that U-shaped clip 150 takes a slightly different shape when legs 151, 152 are biasing second slots 141 and 145 toward each other. It is intended that U-shaped clip 150 fit snugly in slots 139, 147 so that it will in effect "pull" the two panels together. Of course, a U-shaped clip is also inserted in slots 140, 148, but this is not shown in FIG. 8.

Once it is snapped into place, clip 150 remains below the skin surface 155, 156 and it will remain firmly locked in place because it is restrained by undercut slot 157, 158. Clip 150 will not back out or loosen under the stresses caused by the expanding and contracting panels, yet it can easily be pryed out of slots 139, 147 and 140, 148 if it becomes necessary to replace a defective panel or a panel which has become damaged. Also, by being below the skin surface, clip 150 will not be visible, giving the panel a more esthetic appearance, and clip 150 will not catch on parts as they travel through the oven.

In a typical application, a number of insulated panels are assembled at a construction site for the purpose of building a finishing system. The individual panel members are positioned in end-to-end relationship with the seal assembly separating the panels. An interlocking labyrinth seal is formed when the U-shaped clip is snapped firmly into the first slots, thereby drawing the abutting panel members into locked mating relationship. At the same time, the offset spacers of abutting panels are drawn together in mating relationship, thereby drawing the exposed insulation of one panel member into mating relationship with the exposed insulation of an abutting panel to minimize the heat loss through the seal.

As noted above, the seal assembly is designed so that when U-shaped clips are snapped securely into place, they remain at or slightly below the surface of the skins and are held in place by the undercut slots. By restraining the clips with undercut slots, there is virtually no chance that a clip could work loose under the constant stresses created by the heating and cooling cycles in the oven. Also, each seal is formed so that it can expand or contract, further reducing the likelihood that a U-shaped clip could work loose. In addition, there are no welds or other fastening means incorporating in the interlocking seal, thus there is no chance of a stress failure in these areas or the creation of hot spots.

What is claimed is:

1. In a series of insulated panel members defined by an inner skin in parallel spaced relationship with an outer skin, an insulation material occupying the space between the inner and outer skins, the improvement comprising in combination
    means for sealing the top and bottom of the panel,
        means for locking adjacent panel members in end-to-end relationship to form a wall of interconnected insulated panels, the locking means comprising means integral with the end flaps of said inner and outer skins for forming a labyrinth having at least one slot opening outwardly away from said insulation and clip means lockingly engageable with the slots of the adjacent panel members, said labyrinth forming means comprising a series of bends along the end flaps of the inner and outer skins, each end flap being bent inwardly at an angle greater than 90° relative to the skin for a short distance to create an undercut slot, and then continuing inwardly at approximately 90° relative to the siin for a short distance more before being bent outwardly 180° to form an outwardly opening first slot, the flap then being bent 180° inwardly to form an inwardly opening second slot of approximately the same size as the first slot, the flap being bent 180° outwardly and into the second slot to form a lip, and said clip means comprising a U-shaped clip having a pair of legs, the legs sliding into locking engagement with the first slots of abutting panel members, the second slot of each panel member being positioned between the legs of the clip, the legs of the clip extending into the first slots a sufficient distance so that the entire clip is below the surface of the inner and outer skins of the panel member when assembled, a spacer in slidable interlocking relationship with said locking means, the spacer separating and holding the inner and outer skins in parallel spaced relation and to contain the insulation, the spacer having a plurality of slots along its longitudinal axis to expose portions of insulation, the spacer being offset slightly so that when two panel members are locked together the spacer of one panel member is in direct mating relationship with the spacer of the adjacent panel member and the slots of one spacer correspond to the slots of an adjacent spacer to allow the insulation of one panel member to align and contact the insulation of the adjacent panel member which will serve to minimize heat loss through the interconnection.

2. An insulated panel member according to claim 1, wherein said U-shaped clip has the end points of the legs flared outwardly away from one another to allow the U-shaped clip to slide into the first slots more easily and has an angled flat at the base of each leg which is angled so that the flat surface of the angled flat mates the flat surface of the undercut slot and acts to retain the U-shaped clip in the first slots.

3. An insulated panel member according to claim 1, wherein the spacer slidably engages the second slots of the inner and outer skins of a single panel member, each spacer having a plurality of right angle flanges which engage the lips of the end flaps, the spacer defining the distance between the inner and outer skins of the panel member and being held in the second slots by the interlocking relationship of the right angle flanges and the lips.

4. An insulated panel member according to claim 1, wherein said U-shaped clip has, at the base of ach leg, a 90° curve which contacts the flat surface of the respective undercut slot and acts to retain the U-shaped clip in the first slots.

5. In a series of insulated panel members defined by an inner skin in parallel spaced relationship with an outer skin, an insulation material occupying the space between the inner and outer skins, the improvement comprising in combination     means for sealing the top and bottom of the panel, means for locking adjacent panel members in end-to-end relationship to form a wall of interconnecting insulated panels, the locking means comprising means integral with the end flaps of said inner and outer skins for forming a labyrinth having at least one slot opening outwardly away from said insulation and clip means lockingly engageable with the slots of the adjacent panel members, a spacer in slidable interlocking relationship with said locking means, the spacer separating and holding the inner and outer skins in parallel spaced relation and to contain the insulation, the spacer having a plurality of slots along its longitudinal axis to expose portions of insulation, the spacer being offset slightly so that when two panel members are locked together the spacer of one panel member is in direct mating relationship with the spacer of the adjacent panel member and the slots of one spacer correspond to the slots of an adjacent spacer to allow the insulation of one panel member to align and contact the insulation of the adjacent panel member which will serve to minimize heat loss through the interconnection, said means for sealing the top of the panel including a top plate which is integral with and bent approximately 90° to the outer skin, a flap having a first leg positioned between the insulation and the inner skin and a second leg bent approximately 80° thereto and which overlaps the top plate, a top retainer cap slidably engages the inner and outer skins and completely encloses the flap and the plate, the retainer cap having a ledge to support a roof panel.

6. In a series of insulated panel members defined by an inner skin in parallel spaced relationship with an outer skin, an insulation material occupying the space between the inner and outer skins, the improvement comprising in combination     means for sealing the top and bottom of the panel, means for locking adjacent panel members in end-to-end relationship to form a wall of interconnecting insulated panels, the locking means comprising means integral with the end flaps of said inner and outer skins for forming a labyrinth having at least one slot opening outwardly away from said insulation and clip means lockingly engageable with the slots of the adjacent panel members, a spacer in slidable interlocking relationship with said locking means, the spacer separating and holding the inner and outer skins in parallel spaced relation and to contain the insulation, the spacer having a plurality of slots along its longitudinal axis to expose portions of insulation, the spacer being offset slightly so that when two panel members are locked together the spacer of one panel member is in direct mating relationship with the spacer of the adjacent panel member and the slots of one spacer correspond to the slots of an adjacent spacer to allow the insulation of one panel member to align and contact the insulation of the adjacent panel member which will serve to minimize heat loss through the interconnection, said means for sealing the bottom of the panel including a bottom plate which is integral with and bent approximately 90° to the outer skin, a flap having a first leg positioned between the insulation and the inner skin and a second leg bent approximately 80° thereto and which overlaps the bottom plate, a bottom retainer cap slidably engages the inner and outer skins and completely encloses the flap and the plate.

7. In a series of insulated panel members defined by an inner skin in parallel spaced relationship with an outer skin, an insulation material occupying the space between the inner and outer skins, the improvement comprising in combination     means for sealing the top and bottom of the panel, means for locking adjacent panel members in end-to-end relationship to form a wall of interconnecting insulated panels, the locking means comprising means integral with the end flaps of said inner and outer skins for forming a labyrinth having at least one slot opening outwardly away from said insulation and clip means lockingly engageable with the slots of the adjacent panel members, said labyrinth forming means comprising a series of bends along the end flaps of the inner and outer skins, each end flap being bent inwardly at an angle greater than 90° relative to the skin for a short distance to create an undercut slot, and then continuing inwardly at approximately 90° relative to the skin for a short distance more before being bent outwardly 180° to form an outwardly opening first slot, the flap then being bent 180° inwardly to form an inwardly opening second slot of approximately the same size as the first slot, the flap being bent 180° outwardly and into the second slot to form a lip, and said clip means comprising a U-shaped clip having a pair of legs, the legs sliding into locking engagement with the first slots of abutting panel members, the frictional locking engagement between the U-shaped clip and the first slots being enhanced by the mating relationship of the exposed insulation of abutting panels, the second slot of each panel member being positioned between the legs of the U-shaped clip, the legs of the clip extending into the first slots a sufficient distance so that the clip is substantially flush with the surface of the inner and outer skin of the panel member, a spacer in slidable interlocking relationship with said locking means, the spacer separating and holding the inner and outer skins in parallel spaced relation and to contain the insulation, the spacer having a plurality of slots along its longitudinal axis to expose portions of insulation so that as the insulated panels are locked together to form a wall where the spacer of one panel is adjacent and slightly spaced from the spacer of an abutting panel, the slots of one spacer align with the slots of an adjacent spacer to allow the insulation of one panel to correspond with the insulation of an adjacent panel which serves to further minimize heat loss through the interconnection.

8. An insulated panel member according to claim 7, wherein said U-shaped clip has, at the base of each leg, a 90° curve which contacts the flat surface of the respective undercut slot and acts to retain the U-shaped clip in the first slots.

9. An insulated panel member according to claim 7, wherein the spacer slidably engages the second slots of the inner and outer skins of a single panel member, the spacer having a plurality of right angle flanges which abut the lips of the end flaps, the spacer defining the distance between the inner and outer skins of the panel members and being held in the second slots by the interlocking relationship of the right angle flanges and the lips.

10. An insulated panel member according to claim 7, wherein said U-shaped clip has the end points of the legs flared outwardly away from one another to allow the U-shaped flip the slide into the first slots more easily and has an angled flat at the base of each leg which is angled so that the flat surface of the angled flat mates the flat surface of the undercut slot and acts to retain the U-shaped clip in the first slots.

11. In a series of insulated panel members defined by an inner skin in parallel spaced relationship with an outer skin, an insulation material occupying the space between the inner and outer skins, the improvement comprising in combination means for sealing the top and bottom of the panel, means for locking adjacent panel members in end-to-end relationship to form a wall of interconnecting insulated panels, the locking means comprising means integral with the end flaps of said inner and outer skins for forming a labyrinth having at least one slot opening outwardly away from said insulation and clip means lockingly engageable with the slots of the adjacent panel members, a spacer in slidable interlocking relationship with said locking means, the spacer separating and holding the inner and outer skins in parallel spaced relation and to contain the insulation, the spacer having a plurality of slots along its longitudinal axis to expose portions of insulation so that as the insulated panels are locked together to form a wall where the spacer of one panel is adjacent and slightly spaced from the spacer of an abutting panel, the slots of one spacer align with the slots of an adjacent spacer to allow the insulation of one panel to correspond with the insulation of an adjacent panel which serves to further minimize heat loss through the interconnection, said means for sealing the top of the panel including a top plate which is integral with and bent approximately 90° to the outer skin, a flap having a first leg positioned between the insulation and the inner skin and a second leg bent approximately 80° thereto and which overlaps the top plate, a top retainer cap slidably engages the inner and outer skins and completely encloses the flap and the plate, the retainer cap having a ledge to support a roof panel.

12. In a series of insulated panel members defined by an inner skin in parallel spaced relationship with an outer skin, an insulation material occupying the space between the inner and outer skins, the improvement comprising in combination means for sealing the top and bottom of the panel, means for locking adjacent panel members in end-to-end relationship to form a wall of interconnecting insulated panels, the locking means comprising means integral with the end flaps of said inner and outer skins for forming a labyrinth having at least one slot opening outwardly away from said insulation and clip means lockingly engageable with the slots of the adjacent panel members, a spacer in slidable interlocking relationship with said locking means, the spacer separating and holding the inner and outer skins in parallel spaced relation and to contain the insulation; the spacer having a plurality of slots along its longitudinal axis to expose portions of insulation so that as the insulated panels are locked together to form a wall where the spacer of one panel is adjacent and slightly spaced from the spacer of an abutting panel, the slots of one spacer align with the slots of an adjacent spacer to allow the insulation of one panel to correspond with the insulation of an adjacent panel which serves to further minimize heat loss through the interconnection, said means for sealing the bottom of the panel including a bottom plate which is integral with and bent approximately 90° to the outer skin, a flap having a first leg positioned between the insulation and the inner skin and a second leg bent approximately 80° thereto and which overlaps the bottom plate, a bottom retainer cap slidably engages the inner and outer skins and completely encloses the flap and the plate.

* * * * *